Patented Apr. 21, 1953

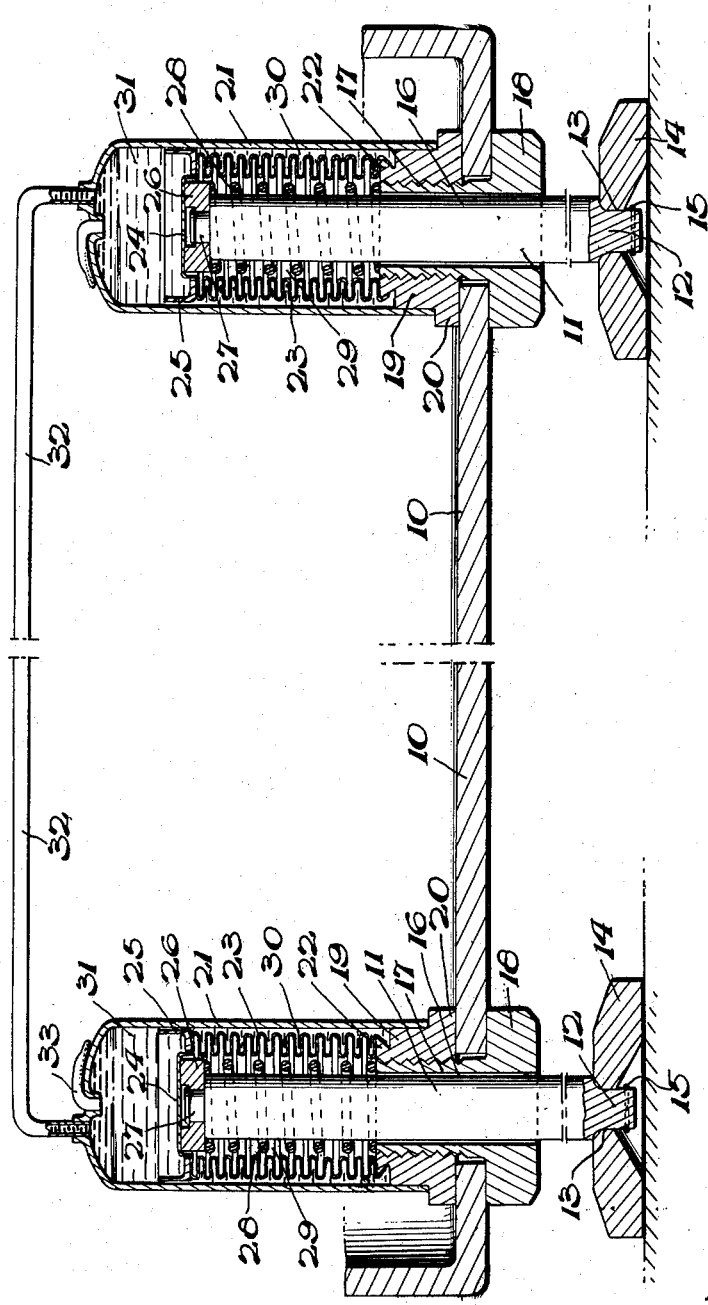

2,635,838

UNITED STATES PATENT OFFICE 2,635,838

EQUALIZING AND VIBRATION ABSORPTION SUPPORT

Charles D. Branson, Knoxville, Tenn., assignor to Robertshaw-Fulton Controls Company, Knoxville, Tenn., a corporation of Delaware Application February 18, 1948, Serial No. 9,188

2 Claims. (Cl. 248—20)

This invention relates to equalizing and vibration absorption supports, and more particularly to supports of the type characterized which are particularly adapted for association with the legs of a machine or other piece of apparatus although, as will be apparent to those skilled in the art, the invention may be readily adapted to other forms of support.

It has heretofore been proposed to employ, in supports for machinery and other apparatus, corrugated expansible and collapsible tubular walls, herein referred to as bellows, to act as cushions or shock absorbers. Owing to the inherent resilience of such bellows they are sensitively responsive to variations of load and therefore are open to the objection that vibrations may not be entirely eliminated even though provided with a dash pot action. Furthermore the corrugations of such a bellows when filled with a liquid tend to bulge individually under sudden increases of pressure so that a support provided by such a bellows may lack the desired rigidity. Supports of this character are also open to the objection that owing to the lateral flexibility of a bellows, desired stability may be difficult to obtain.

It has also been proposed to provide a load equalizing support in the form of a plurality of piston and cylinder devices wherein the cylinders are interconnected and charged with a liquid, so that fluctuations of pressure at one cylinder will be transmitted to the other cylinders to equalize the pressure and restore balance. Devices of this character are open to the objection that such a construction does not hermetically seal the liquid in the cylinder, so that eventual leakage will result in a loss of effectiveness, and if the fit between the piston and cylinder is made sufficiently tight to minimize leakage the support becomes relatively rigid and unyielding insofar as absorption of vibration is concerned. Particularly in household equipment, such as washing machines, leakage from the support system is highly undesirable because of the necessity of frequent attention by service men in order to keep the support system in properly operative condition.

It is an object of this invention to provide an improved support for machines or other apparatus which equalizes the pressure between the points of support and at the same time is highly effective in absorbing vibrations arising from the operation of the machine or other apparatus.

Another object of this invention is to provide an improved support of the type characterized whereby pressure at the points of support is promptly equalized if there is unevenness at the supporting surface, and which will effect a prompt equalization of pressure at the points of support if the machine or other apparatus is moved to another position where unevenness at the supporting surface may cause a redistribution of the load at the points of support.

Another object of this invention is to provide an improved support of the type characterized wherein the supporting means at each point of support is so constructed as to function as a vibration absorber.

Another object of this invention is to provide an improved support of the type characterized wherein equalization of pressure at the several points of support may be effected by a hydraulic system without danger that the operation of the supporting system will be impaired by loss of liquid.

Another object of this invention is to provide an improved support of the type characterized wherein a hydraulic system is utilized to equalize the pressure at the several points of support and the supporting means at each point of support is so constructed as to function somewhat like a dash pot so as to prevent rapid fluctuations of pressure from vibrating the support.

Another object of this invention is to provide an improved support of the type characterized which utilizes a hydraulic system that promptly responds to changes of load at the points of support but at the same time is not responsive to rapid fluctuations of load at the several points of support.

Another object of this invention is to provide an improved support of the type characterized which utilizes bellows to prevent leakage from a hydraulic equalizing system without introducing instability or loss of desired rigidity in the presence of vibration or rapidly fluctuating variations of load.

Another object of this invention is to provide an improved support of the type characterized which is composed of relatively simple parts that are easy to fabricate and assemble and which is highly efficient in operation.

Other objects of the invention will appear as the description of the invention proceeds.

The invention is capable of receiving a variety of mechanical expressions, only one of which has been illustrated on the accompanying drawing, and it is therefore to be expressly understood that the drawing is for purposes of illustration only, and is not to be construed as a definition of the limits of the invention, reference being had to the appended claims for that purpose.

The accompanying drawing illustrates somewhat schematically an embodiment of the present invention applied to two of the legs for supporting any suitable machine or piece of apparatus.

As illustrated, 10 designates a portion of the frame of any suitable machine or piece of apparatus which may be mounted on any desired number of supporting members, here shown as legs 11. To illustrate the invention, only two legs have been shown, but it is to be expressly understood that each leg is to be provided with apparatus as described, with suitable interconnection between all of the devices associated with the several legs, so that, irrespective of the number of legs, there will be an equalization of pressure, as to be explained, between all of the points of support.

As the construction at each leg is preferably the same, it will be sufficient to describe the apparatus at one leg, like reference characters indicating the corresponding parts at the other leg or legs. Each leg 11, which may be of any length, form and construction, is shown as having the form of a rod or bar which is reduced in diameter at its lower extremity 12 where it passes through the aperture 13 of a foot 14 of any suitable size, form and construction. Extension 12 may be retained in the aperture 13 in any suitable way, as by a snap ring, cotter pin or other appropriate device 15. Reduced extension 12 preferably has a somewhat loose fit in the aperture 13 so that the foot 14 may have some play with respect to the leg and therefore adjust itself to the inclination or irregularity of the floor while the leg retains its intended position without tilting the frame 10.

The leg 11 may be mounted on the frame 10 in any suitable way. As shown, said leg extends slidably through the aperture 16 of a frame member in the form of a sleeve 17 having a head 18 which is clamped against the frame member 10 by a nut 19 threaded onto said sleeve and having a head 20 between which and the before-mentioned head 18 frame member 10 is tightly gripped.

Mounted on the nut 19, and secured thereto in any suitable way as by brazing or soldering so as to provide a hermetic seal therewith, is a housing herein designated as a cylinder 21, of a piston and cylinder device although, as will be readily understood it need not be circular in cross section to provide a cylinder in the geometrical sense. Hermetically sealed to a flange 22 on said nut 20 is a bellows 23 having suitably secured thereto or formed thereon a movable end wall 24. Mounted on said wall 24 in any appropriate way is a washer 25 of suitable material such as metal conforming with the cylinder 21 and having a sliding fit therein, with slight clearance as hereinafter explained, so as to provide the piston element of the before-mentioned piston and cylinder device. The end of the leg 11 opposite the foot 14 is engaged with or secured to the movable end wall 24 in any suitable way, the construction shown including a block 26 secured on a reduced extension 27 of the leg 11 and having engagement with said movable wall 24. A load-supporting coil spring 28 is interposed between the block 26 and the end of the nut 18. The springs 28 are of such size and strength that they retain parts 27 and 26 in contact with the bottom of the bellows whenever the machine is lifted from the floor.

Piston 25 as shown in the drawing subdivides the interior of the cylinder 21 into two chambers, one above and the other below said piston. The lower chamber in turn is subdivided by the bellows 23 so as to provide a chamber 29 interiorly of the bellows and a chamber 30 exteriorly of the bellows. The chamber 31 above the bellows is connected by any suitable conduit 32 to the corresponding chambers 31 of the piston and cylinder devices at the other legs. While the piston 25 has a sliding fit within the cylinder 21, a small clearance is provided between the piston and cylinder so that liquid may pass between the chambers 30 and 31 at a relatively slow rate thereby providing a dash pot action as to be explained. The magnitude of said clearance, which ordinarily will be on the order of a thousandth of an inch, will depend, under principles well understood in the art, on the viscosity of the liquid used and the speed of response desired of the dash pot. Similarly, the leg 11 while having a sliding fit in the sleeve 17 has sufficient clearance therebetween so as to provide a vent for air from the chamber 29 to the outside. As originally installed, all of the chambers 30 and 31, together with their communicating conduits 32, are solidly filled with any suitable liquid, as oil or water, a filling tube being indicated at 33 which is hermetically sealed after the liquid-containing chambers and passages have been filled.

Assuming that each of the legs of the machine or other piece of apparatus has been provided with structures as so far described, with the chambers 30 and 31 and the communicating passages 32 of all the structures at the several legs solidly filled with liquid, the machine or other piece of apparatus represented by the element 10 of the frame is supported on said legs 11 through the intermediary of the pressure in the sealed system acting on the mean effective area at the several bellows 23. With the chambers 30 and 31 and the communicating passages 32 solidly filled with liquid, said piston and cylinder devices with their associated passages constitute a hydraulic system which equalizes the pressure on the legs. If by reason of the unevenness of the floor one of the feet 14 is at a higher level than the others, its associated piston 25 will be at a correspondingly higher position, decreasing the volume of the associated chamber 31, but by reason of the flow of liquid through the intercommunicating passages 32 balance will be restored, equalizing the pressure at the several legs. If the machine or other apparatus is moved so that the contour of the floor causes a readjustment of the levels at the feet 14, the hydraulic system thus provided immediately adjusts itself to equalize the pressure at the several legs. Thus the machine or other piece of apparatus may be moved from place to place with assurance that there will be an equalization of pressure at the several points of support even though the supporting surface is uneven or irregular. Furthermore, as before pointed out, the feet can adjust themselves to the contour of the floor without interfering with the upright position of the legs.

When the pistons at the several legs are moved with respect to their cylinders in so effecting equalization of pressure the liquid may flow through the clearance between each piston and cylinder so as to maintain solidly full the chambers 30 below the pistons, and as the bellows expand or contract during such readjustment, air may flow into or out of the chambers 29 through the clearance between the legs 11 and sleeves 17 so that equalization of pressure is not upset by any variation of air pressure in the chambers 29.

If during the operation of the machine or other piece of apparatus there are fluctuations of pressure at the legs, such as may arise for example by reason of the vibration of the machine in operation, these vibrations are not transmitted to the legs 11 because of the dash pot action of each piston and cylinder. Liquid may flow into and out of each chamber 30 only through the clearance between the piston 25 and cylinder 21. If there is a sudden surge of pressure in any chamber 31 which would tend to compress the associated bellows 23, compression of the bellows is resisted by the liquid in the corresponding chamber 30 and can take place only as rapidly as liquid may flow out of the chamber 30 into the chamber 31 through the aforesaid clearance between the piston and cylinder. Similarly, upon a sudden release of pressure in any chamber 31, the tendency to cause expansion of the bellows 23 under the action of the spring 28 is resisted by the tendency to create a suction in the chamber 30 which can be relieved only as rapidly as liquid can flow through the clearance between the piston and cylinder from the chamber 31 into the chamber 30. Therefore, the piston and cylinder device at each leg absorbs the vibration or rapid fluctuation of pressure due to the operation of the machine or other piece of apparatus because of the dash pot action of the piston and cylinder, the pistons shielding the bellows from the rapid fluctuations of pressure but yielding to some extent to absorb the vibrations.

It will therefore be perceived that the present invention provides a pressure equalizing and shock absorbing support which uses a hydraulic system for equalizing the pressure at the points of support but which at the same time is hydraulically sealed so that no liquid can escape therefrom. Therefore there is no danger that the operation of the support will be impaired by leakage—a consideration of paramount importance in connection with domestic equipment, as for example washing machines, where replacement of the lost liquid would require frequent trips by service men in order to keep the support in properly operating condition. While the yieldability and resilience of a bellows is employed in obtaining the desired equalization of pressure, the fact that the bellows is surrounded by a chamber solidly filled with liquid shielded by the piston from rapid fluctuations of pressure assures that the bellows will not respond sensitively to such fluctuations of pressure and reduce desired rigidity. As the bellows is associated with a piston guided in its movements with respect to the surrounding cylinder, the capacity of the bellows to yield laterally does not introduce any element of instability. Each piston functions as a dash pot so as to prevent rapid fluctuations of pressure from being transmitted to the bellows, but without preventing a flow of liquid between the piston and cylinder so as to permit prompt response to an uneven distribution of pressure at the several legs. Thereby shock absorption is provided at each leg without interfering with the equalization of pressure at the several legs, while such equalization is maintained without introducing instability, bouncing, or other undesired response to vibration at the points of support. The construction employed is also composed of relatively simple parts that are easy to fabricate and assemble, and the system thus provided is strong and durable.

While the embodiment of the invention illustrated on the drawing has been described with considerable particularity, it is to be expressly understood that the invention is not limited thereto, as the same may receive a variety of mechanical expressions as will now be apparent to those skilled in the art, while changes may be made in the details of construction, size, proportion, arrangement, etc., parts may be replaced by equivalent parts, the invention may be adapted to any suitable number of points of support and to structures not mounted on legs as well as those provided with legs, etc., without departing from the spirit of this invention. Reference is therefore to be had to the appended claims for a definition of the invention.

What is claimed is:

1. In a device of the character described, in combination with a frame member, supporting means therefor including a leg, a piston mounted on said leg, a cylinder mounted on said frame member and surrounding said piston, said leg forming with said piston a chamber at one side of said piston, a bellows associated with said piston and defining within said cylinder an expansible and collapsible chamber on the other side of said piston, said piston having a slight clearance with said cylinder through which said chambers are in communication to act as a dash pot, a liquid filling both of said chambers, said bellows defining a chamber interiorly thereof, said leg passing through an aperture in said frame member and having a clearance with said aperture in communication with said last named chamber through which said chamber is vented to atmosphere, and a passage in communication with said first named chamber through which variations of pressure are transmitted to the liquid therein.

2. In a device of the character described, in combination with a frame member, a leg mounted to slide in an aperture in said frame member, a piston mounted on the end of said leg, a cylinder mounted on said frame member and surrounding said piston, said piston and cylinder forming a chamber at one side of said piston, a bellows associated with the opposite side of said piston and surrounding said leg and hermetically sealed to said cylinder to form an expansible and collapsible chamber therebetween, said piston having a slight clearance with said cylinder through which said chambers are in communication to act as a dash pot, a liquid filling both of said chambers, said bellows defining a chamber interiorly thereof, said leg passing through an aperture in said frame member and having a clearance with said aperture in communication with said last named chamber through which said chamber is vented to atmosphere, a spring reacting between said frame member and said piston to carry the load on said frame member, and a passage communicating with said first named chamber through which variations of pressure are transmitted to the liquid therein.

CHARLES D. BRANSON.

References Cited in the file of this patent

UNITED STATES PATENTS

| Number | Name | Date |
|---|---|---|
| 1,439,417 | Holmes | Dec. 19, 1922 |
| 1,493,746 | Glaser | May 13, 1924 |
| 1,785,339 | Daland | Dec. 16, 1930 |
| 2,038,968 | Summers | Apr. 28, 1936 |
| 2,106,886 | Chisholm | Feb. 1, 1938 |
| 2,401,193 | Sabin | May 28, 1946 |